United States Patent
Cantrill

(10) Patent No.: US 7,047,447 B2
(45) Date of Patent: May 16, 2006

(54) METHOD AND SYSTEM FOR POSTMORTEM OBJECT TYPE IDENTIFICATION

(75) Inventor: Bryan Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 10/346,423

(22) Filed: Jan. 16, 2003

(65) Prior Publication Data

US 2004/0143717 A1 Jul. 22, 2004

(51) Int. Cl.
*G06F 11/00* (2006.01)

(52) U.S. Cl. .............................. 714/38; 714/5; 714/37; 711/170

(58) Field of Classification Search .................... 714/5, 714/7, 8, 37, 38; 711/170–173; 717/124, 717/127–129
See application file for complete search history.

(56) References Cited

U.S. PATENT DOCUMENTS

| | | | | |
|---|---|---|---|---|
| 5,999,933 A | * | 12/1999 | Mehta | 707/100 |
| 6,754,771 B1 | * | 6/2004 | Vincent | 711/117 |
| 6,944,722 B1 | * | 9/2005 | Cantrill | 711/147 |
| 2004/0030960 A1 | * | 2/2004 | Ito | 714/38 |

* cited by examiner

*Primary Examiner*—Scott Baderman
*Assistant Examiner*—Timothy M. Bonura
(74) *Attorney, Agent, or Firm*—Martine Penilla & Gencarella, LLP

(57) ABSTRACT

A method for postmortem object type identification. In one method embodiment, the present invention accesses a memory dump. Next, a portion of the memory dump is partitioned into a first group of known memory object types. Additionally, a portion of the memory dump is partitioned into a second group of unknown memory object types. A first pointer, pointing from one of the first group of known memory object types to one of the second group of unknown memory object types, is then utilized to automatically infer the memory object type of one of the second group of unknown memory object types. A second pointer, pointing from the inferred memory object type to one of the second group of unknown memory object types is utilized to automatically infer a memory object type of another one of the second group of unknown memory object types.

28 Claims, 11 Drawing Sheets

600

| | | |
|---|---|---|
| typegraph: | pass => 2 | |
| typegraph: | nodes => 140638 | |
| typegraph: | unmarked => 96110 | (68.3%) |
| typegraph: | known =>6890 | ( 4.8%) |
| typegraph: | conjectured => 117367 | (83.4%) |
| typegraph: | conjectured fragments => 370 | ( 0.2%) |
| typegraph: | known or conjectured => 124627 | (88.6%) |
| typegraph: | conflicts => 1740 | |
| typegraph: | time elapsed, this pass => 13 seconds | |
| typegraph: | time elapsed, total => 38 seconds | |

\> de7ae628::whattype
    de7ae628 is de7ae628+0, possibly struct swapnode

\> dea4a3c0::whattype
    dea4a3c0 is dea4a3c0+0, struct seg

```
> de7ae628::whattype -v
BASE      LIMIT     TYPE                      SIZE  REACH  MARKED
de7ae628  de7ae688  <unknown>                   -1      0  yes
```

| INFERENCE | FROM | SRCOFFS | REFTYPE | REFMEMBER |
|---|---|---|---|---|
| struct swapnode | de797d88 | 44 | struct swapnode * | - |

| FRAGMENT | FROM | SRCOFFS | REFTYPE | REFMEMBER |
|---|---|---|---|---|
| struct vnode | df114008 | 0 | struct anon | an_vp |

| FROM | SRCOFFS | DESTOFFS | MARKED | STATUS | REACH |
|---|---|---|---|---|---|
| de797d88 | 44 | 0 | yes | infered | 0 |
| fec1a700 | 2e0 | 8 | yes | known | 0 |

| TO | SRCOFFS | DESTOFFS | MARKED | STATUS | REACH |
|---|---|---|---|---|---|
| de7ae628 | 3c | 0 | yes | infered | 0 |
| de7ae628 | 30 | 8 | yes | infered | 0 |
| de7ae628 | 2c | 8 | yes | infered | 0 |

FIG. 6D

METHOD AND SYSTEM FOR POSTMORTEM OBJECT TYPE IDENTIFICATION

FIELD OF THE INVENTION

The present invention relates to the field of object type identification. Specifically, the present invention relates to object type identification performed on a memory dump.

BACKGROUND ART

Presently, computer systems and the operation thereof are utilized in all facets of modern life. For example, computer systems are common both at home and in the workplace to increase output as well as provide user convenience. Accordingly, there is a need for many different types of software to operate on computer systems. However, with the mix of operating systems and the software operating thereon, the probability of technical errors and computer system crashes and/or failures are high.

Memory corruption problems are one of the major causes for computer system failure. When debugging kernel memory corruption problems, as stated herein, it is often determined that the corrupted buffer has been erroneously written to by a user of an adjacent buffer. By determining the specifics of the adjacent buffer an insight into the cause of the corruption may be gained. For example, with reference to FIGS. 1A and 1B, normally two buffers (e.g., 105 and 110 of FIG. 1A) operate without negative interaction (e.g., the data placed within a buffer is not more than the buffer can handle). However (with reference now to FIG. 1B), a buffer overrun 125 is one of the possible memory corruption problems that may cause a computer system to crash. In general, a buffer overrun 125 occurs when a first buffer (e.g., 105) overruns (e.g., 115) its allotted space and "treads" upon another buffer (e.g., 110). Later on, when the buffer which has been "trodden" upon (e.g., 110) is accessed; it may induce an error in the system. This error will often be the cause for a system crash. In some cases, as long as the situation remains unresolved each time the sequence of overrun and access occurs, the system will crash. In other cases, the buffer overrun may occur during an initial process such as startup. In that case, the system may not return to an operational state until a technician resolves the problem.

In many cases, in order to diagnose a buffer overrun a postmortem analysis of the crashed memory dump is required to determine or try to determine the identity of the subsystem that caused the overrun condition. For example, a technician will analyze the crashed memory dump ("crash dump") and initially ascertain that indeed buffer 110 has been trodden upon. The next step may be to identify the buffer 105 which did the overrunning 115 and establish a root-cause. However, identification of an arbitrary buffer 105 or subsystem may be very difficult.

One method for identifying an arbitrary buffer or subsystem operating in a system is to track each and every allocation of every buffer in a system. For example, a program may be utilized to record the buffer being allocated and the subsystem allocating it. Therefore, when the identity of a specific buffer is needed, the technician may simply access the record of buffer allocations and instantly receive information on the subsystem that utilized the buffer and caused the overrun.

However, the utilization of a buffer recording program has deleterious effects on the system during normal operation. That is, although the recording of buffer allocation is extremely helpful during analysis of a crashed system, in a well operating system the effects are extremely detrimental. For example, a system operating with a buffer allocation recording program may be slowed by a factor of two. In that case, a user would sacrifice up to half of the operational capabilities of a system in order to ensure that a system crash involving buffer overrun could be easily resolved.

In order to resolve buffer overrun without the user having to endure a slowed system, a second method may be utilized to resolve the identity (type) of the arbitrary (unknown) buffer 105 involved in the initial overrun 115. That is, in order to determine the type of an arbitrary memory buffer, a technician may be forced to use debugger commands such as "::kgrep" (e.g., search memory for pointer) and "::whatis" (e.g., identify allocating kernel memory cache of a given pointer) in alternating succession. For example, once the arbitrary buffer 105 is found, a first routine (e.g., ::kgrep) will search through the kernel memory for any pointers (e.g., pointer 135) indicating the arbitrary buffer 105. When a pointer 135 is found, a second routine (e.g., ::whatis) will try to identify the buffer 130 (or the cache 130 that allocated the buffer 105) at the source of the pointer 135. When an object of known type is finally reached, types can be back propagated to determine the type of the unknown object. For example, if it is successful, then cache 130 (e.g., process from process cache, thread from thread cache, message block from message block cache, or the like) which allocated the arbitrary buffer 105 may be known and the system problem may then be resolved by focusing on the problem within the specified cache 130.

However, the problem with utilizing the initial buffer 105 as the starting point generally occurs after the two routines have been run three to four times. For example, if the second routine cannot identify the second buffer or cache 130 with a pointer 135 to the unknown buffer 105, then the first routine (e.g., ::kgrep) must be used to find a pointer pointing to the second buffer 130. Once that pointer is found, the second routine (e.g., ::whatis) will try to identify the buffer at the source of the pointer (e.g., the third buffer). This process can go on ad infinitum. However, as stated herein, after about the third or fourth level, the plurality of possible buffer types and pointers become overwhelming to manually process, and the process will stop or be to difficult to manually derive the solution. Due to the exponential increase in buffer type possibilities, the probability of resolving a manual solution becomes minute. Therefore, the process of buffer identification beginning at the stepped-on buffer and working backward is tedious, incomplete, and error-prone.

SUMMARY OF INVENTION

The present invention provides, in various embodiments, an automated method and system for object type identification in a memory or "crash" dump that may be used to then easily determine the subsystem that was responsible for the system crash. Furthermore, the present invention provides a method and system for postmortem object type identification and resolves the identity of most of the objects within the memory dump without tracking object allocation during the operational times of a computing system. Additionally, the present invention provides a method and system for postmortem object type identification which is cost efficient and time saving.

In one embodiment, the present invention helps a technician that has accessed a memory or "crash" dump to figure out which system caused the crash. In general, by establishing a graph (or chart) of the type of the nodes within the memory dump, the technician can narrow the search for the cause of a system crash or error to a specific subsystem. For example, if the subsystem for the desired node can be found, the technician will have a specific subsystem to search for the error. In another case, if the subsystem for the desired node can be narrowed down to only a portion of the subsystems, the technician will have a much smaller search requirement in order to find the specific subsystem that caused the error.

Specifically, in one embodiment, the present invention accesses a memory dump. A portion of the memory dump is partitioned into a first group of known memory object types. Additionally, a portion of the memory dump is partitioned into a second group of unknown memory object types. A first pointer, pointing from one of the first group of known memory object types to one of the second group of unknown memory object types, is then utilized to automatically infer the memory object type of one of the second group of unknown memory object types. A second pointer, pointing from the inferred memory object type to one of the second group of unknown memory object types is utilized to automatically infer a memory object type of another one of the second group of unknown memory object types.

In one embodiment, the inferring of unknown memory object types may include a plurality of passes to ensure the highest accuracy. The passes may progress from most conservative to least conservative. For example, the initial inferring of unknown memory object types may be the result of pointer types from known and inferred nodes performed only for propagated-to nodes that are of the same size as their pointed-to type. A second pass may then be utilized for inferring nodes that are not of the same size as their pointed-to type (e.g., array structures). A third pass may infer nodes by performing type coalescence. A fourth pass may infer nodes by performing non-array type inference. Finally, a post-pass report may be generated indicating the node having the largest unknown reach and offering the technician the user to manually resolve the unknown node type.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

FIG. 6A is an exemplary report of the possible results of a processed memory dump in accordance with one embodiment of the present invention.

FIG. 6B is an exemplary result of a "::whattype" protocol in accordance with one embodiment of the present invention.

FIG. 6C is another exemplary result of a "::whattype" protocol in accordance with one embodiment of the present invention.

FIG. 6D is an exemplary verbose version of a "::whattype" protocol in accordance with one embodiment of the present invention.

DETAILED DESCRIPTION OF THE INVENTION

Figure 1A:
FIGS. 1A and 1B are block diagrams of buffer overruns within a memory.
Figure 1B:
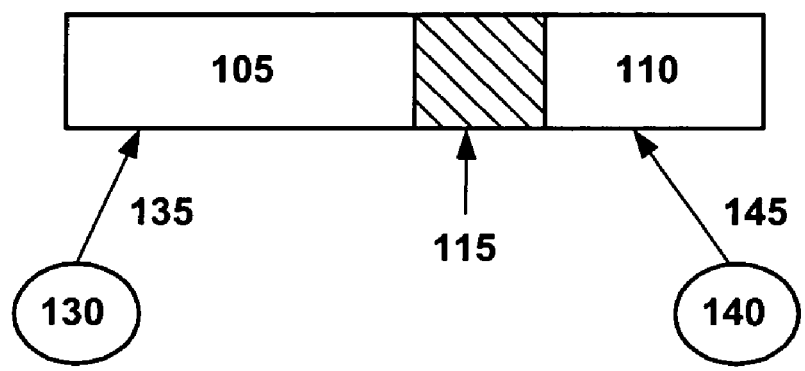

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "partitioning", "receiving", "processing", "creating", "storing", "utilizing", "accessing", "generating", "providing", "separating", "enqueuing", "dequeuing", "performing", "marking" or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

Figure 2:
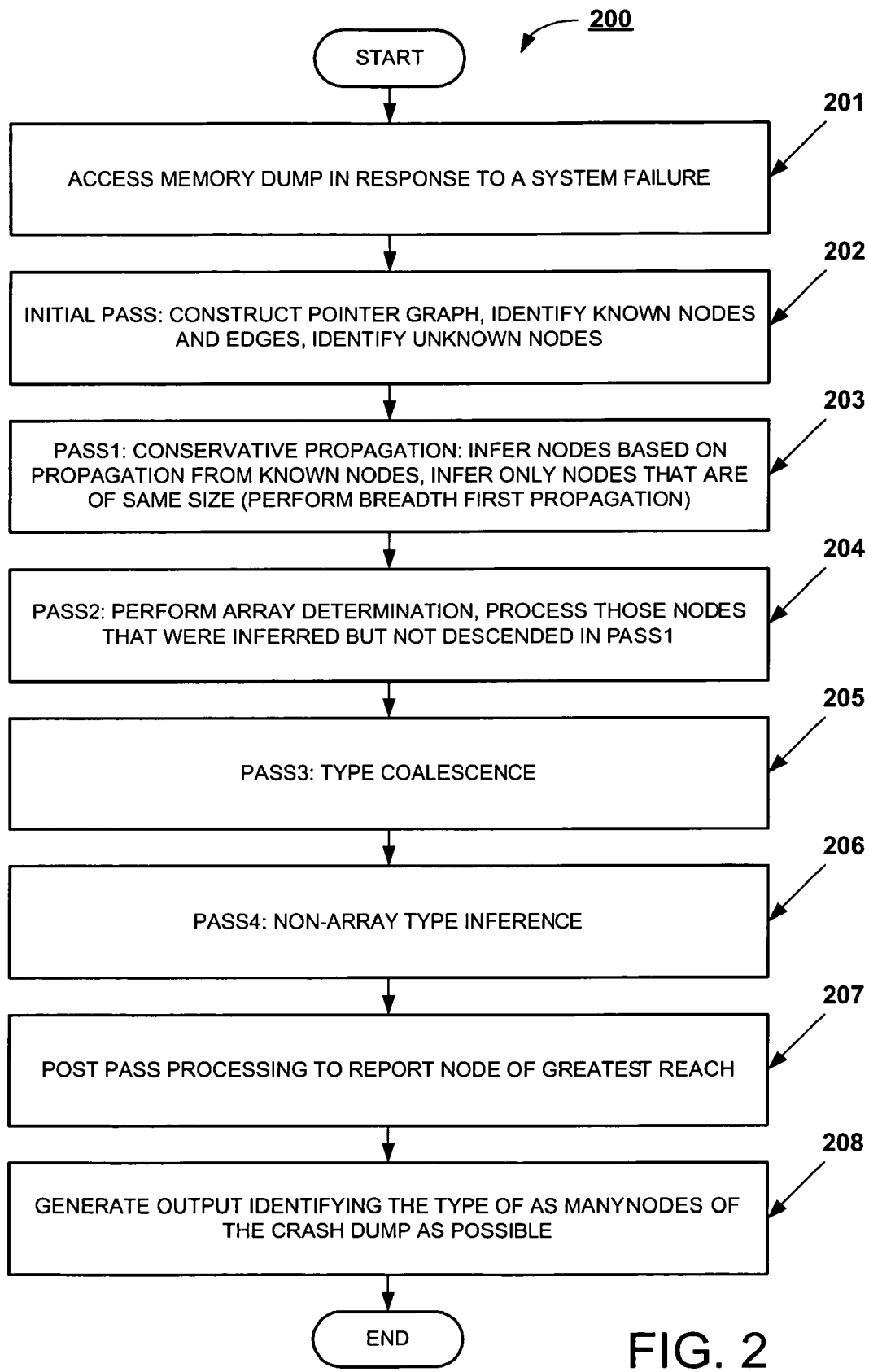
FIG. 2 is a flowchart of the passes performed for postmortem object type identification in accordance with one embodiment of the present invention.

With reference now to FIG. 2, a flowchart of the passes performed for postmortem object type identification is shown in accordance with one embodiment of the present invention. In general, process 200 may be one embodiment that is utilized for examining a memory or crash dump.

Figure 3A:
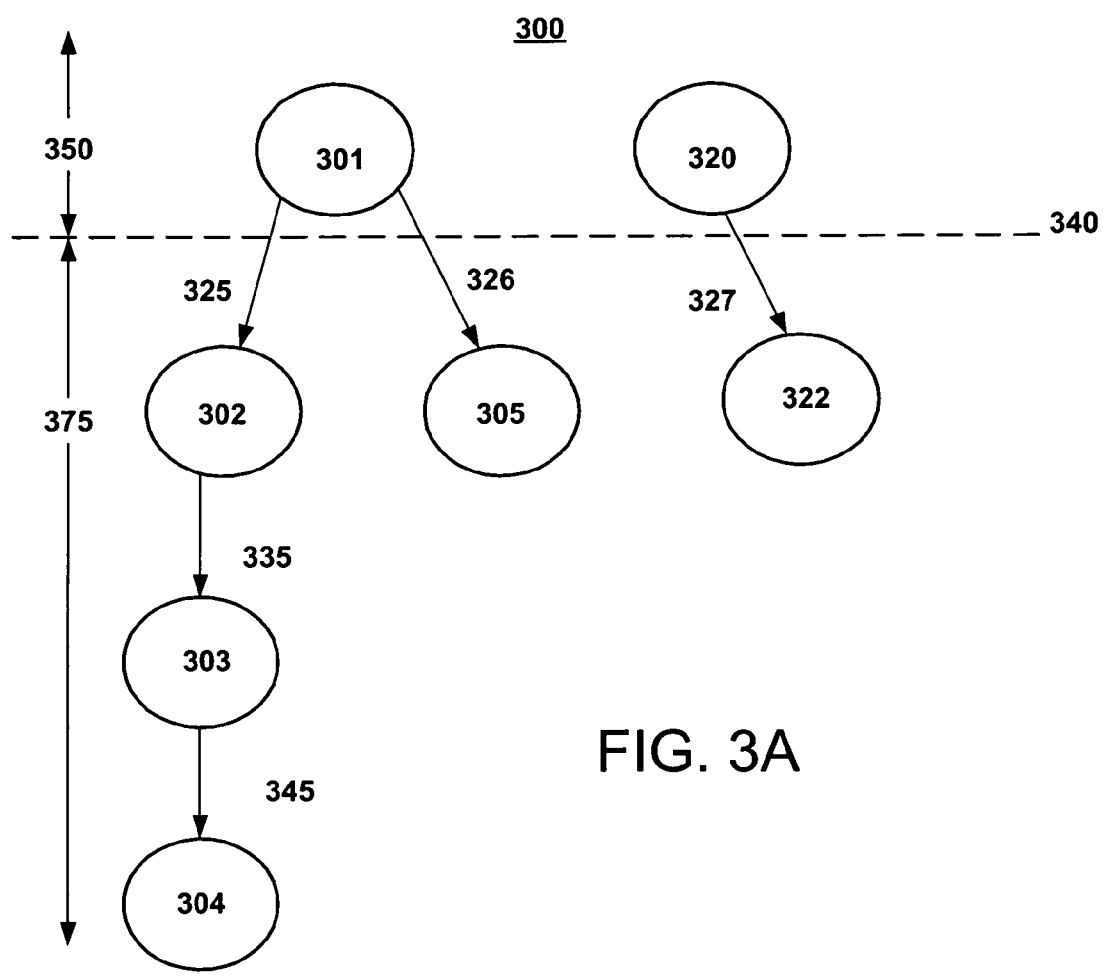
FIG. 3A is a block diagram of an embodiment of an exemplary partitioning of memory objects in accordance with an embodiment of the present invention.

With reference still to FIG. 2, and now to step 201, a memory dump is accessed in response to a system failure. For example, as shown in FIG. 3A, one method for resolving the identity of an unknown buffer in a memory or crash dump (e.g., a postmortem memory dump) is to initially lay out the objects within the memory dump into two sections (e.g., build a pointer graph). within the memory dump 300, each memory object may be a node (e.g., 301 through 322). Moreover, in one embodiment, each memory object may be dynamically allocated. Furthermore, in memory dump 300 pointers (e.g., 325 through 345) are utilized to point from one node to another.

Referring now to step 202 of FIG. 2, an initial pass through the memory crash dump is utilized to construct a pointer graph, identify known nodes and edges, and identify unknown nodes and edges. In one embodiment, each node in the graph is a memory object (e.g., either a static object form module data, or a dynamically allocated memory object), and each node's outgoing edges represent pointers from the object to other memory objects in the system. Once the graph is constructed, the process starts at nodes of known types, and uses the type information to determine the type of each pointer represented by an outgoing edge. Determining the pointer type allows us to determine the type of the edge's destination node, and therefore to iteratively continue the process of type identification. In one embodiment, this process works as long as all pointed-to objects are exactly the size of their inferred types.

For example, in FIG. 3A memory dump 300 is partitioned into two groups of memory object types (or node types). In one embodiment, a first section 350 is utilized to store (or list or enqueue) the known memory object types (e.g., 301 and 320). Furthermore, a second section 375 is used to store (or list or enqueue) the portion of unknown memory object types (e.g., 302, 303, 304, 305, and 322) in the memory dump. Additional details on an exemplary implementation of the pointer graph are set forth in commonly-owned U.S. patent application Ser. No. 09/512,842 filed Feb. 25, 2000, entitled "SYSTEM FOR ARBITRARY RESOLUTION INTERVAL TIMEOUTS", which is hereby incorporated by this reference.

In one embodiment, the memory objects stored in first section 350 are nodes which may be contained within module data segments. They may also be nodes allocated from kernel memory caches of a known type. For example, these memory objects (e.g., 301 and/or 320) may be "PROC_T" type nodes allocated from the process cache. Furthermore, the memory object may be from any of a plurality of known kernel memory caches such as process from process cache, thread from thread cache, message block from message block cache, or the like. The utilization of PROC_T is merely for purposes of brevity and clarity.

With reference still to FIG. 3A, once all known objects have been recognized and queued into first section 350, each node in first section 350 may then be analyzed for pointers pointing to nodes of an unknown type in second section 375. For example, node 301 may be analyzed and pointers 325 and 326 may be processed. Specifically, the known (or inferred) type of-node 301 and pointer 325's and 326's source offsets may be utilized to determine the type of pointer 325 and pointer 326. Once the pointer type has been determined, the pointer type (e.g., pointer 325) may be dereferenced to determine the destination node type (e.g., node 302). For example, if node 301 were a PROC_T, and at offset hex 38 the PROC_T has a pointer to an ANON_T, then if pointer 325 is an unknown pointer at offset hex 38, node 302 is an ANON_T.

Once the destination node type (e.g., node 302) is determined, the destination of node 302 may be added to the node type list (e.g., node 302 may be marked as an inferred memory object type and node 302 may then be transferred to a location within first section 350). In that way, node 302 is enqueued into the known node types of memory dump 300. Thus allowing for a breadth-first type of propagation for resolving the identity of node types throughout a kernel memory dump of data. In one embodiment, the kernel memory dump of data may be a postmortem crash memory dump.

Referring still to FIG. 3A, as stated herein, this initial process may be repeated for each of the known memory object types (e.g., node 320). Furthermore, after a previously unknown node type (e.g., node 302) has been determined, the inferred memory object (e.g., node 302) may then be analyzed for pointers pointing to nodes of an unknown type. For example, node 302 may be analyzed and pointer 335 may be processed. Specifically, the known (or inferred) type of node 302 and pointer 335's source offset may be utilized to determine the type of pointer 335. Once the pointer type has been determined, the pointer type (e.g., pointer 335) may be dereferenced to determine the destination node type (e.g., node 303). For example, if node 302 is an ANON_T, and at offset hex 38 the ANON_T has a pointer to a PROC_T, then if pointer 335 is an unknown pointer at offset hex 38, node 303 is a PROC_T.

Once the destination node type (e.g., node 303) is determined, the destination of node 303 may be added to the node type list (e.g., node 303 may be marked as an inferred memory object type and node 303 may then be transferred to a location within first section 350). In that way, node 303 is enqueued into the known node types of memory dump 300. This allows for a breadth-first type of propagation for resolving the identity of node types throughout a kernel memory dump of data.

The process for object type identification may be continued throughout the entire memory dump or until the desired object has been identified. For example, referring still to FIG. 3A, if node 304 is the unknown node which caused the initial buffer overrun, then after node 304 has been identified, the structure which allocated node 304 will also be known. Therefore, it may be a simple matter of evaluating the particular structure type within the system to find the cause of the initial buffer overrun. For example, in a normal system there may be 25,000 structure types, searching the system for an error caused by an unknown structure is a large and time-intense process. However, searching for an error caused by one structure is a much smaller and easier process. Specifically, 24,999 possible structure types may already be taken out of the search.

In one embodiment, the process of inferring memory object types may be more complex than the method described thus far. For example, there may be a plurality of programming nuances that may lead the process described herein to incorrectly assume (and label, or enqueue) a memory object type. That is, the process will work correctly as long as all nodes (e.g., memory objects) are exactly the size of their inferred type. However, in some programming languages (e.g., C, C++, or the like) this may not always be the case. For example, if a node is larger (or smaller) than its pointed-to type, it may be an array of objects of pointed-to type, or it may be an object of the pointed to type followed by an array of that type's last member, or it may be an object of a larger (or smaller) type that is not either of the above mentioned options.

Figure 3B:
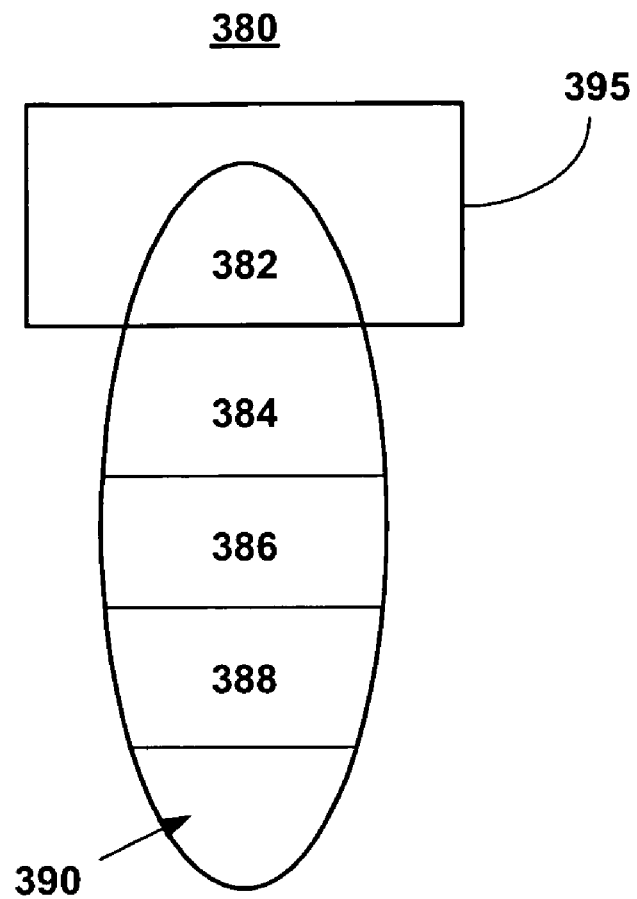
FIG. 3B is a block diagram of an exemplary method for large structures to embed smaller structures in accordance with an embodiment of the present invention.

In some cases, a programming language (e.g., C, C++, or the like) may not force a distinction between a pointer to a single object and a pointer to an array of objects. For example (as shown in FIG. 3B), "vnode_t *" may be a pointer to a single "vnode_t," or an array (e.g., 380) of "vnode_t's." Furthermore, the programming language may not perform bounds checking on array indexing. In fact, it may be possible for a structure to be implicitly followed by an array 380 of the type of the last member. For example, if a structure is allocated, an array the size of n–1 may be added to the size of the allocation. This allows the array to be referenced using a programming languages conventional array syntax without requiring an additional memory difference. ISO C99 calls the last member in such a structure the flexible array member (FAM).

In yet another programming possibility, it is possible for large structures to embed smaller structures and to pass pointers to the smaller structures to more generic subsystems. This process allows the programmer to inherit properties of one structure thereby adding an amount of functionality to the second structure. This type of programming is known as polymorphism.

Figure 4:
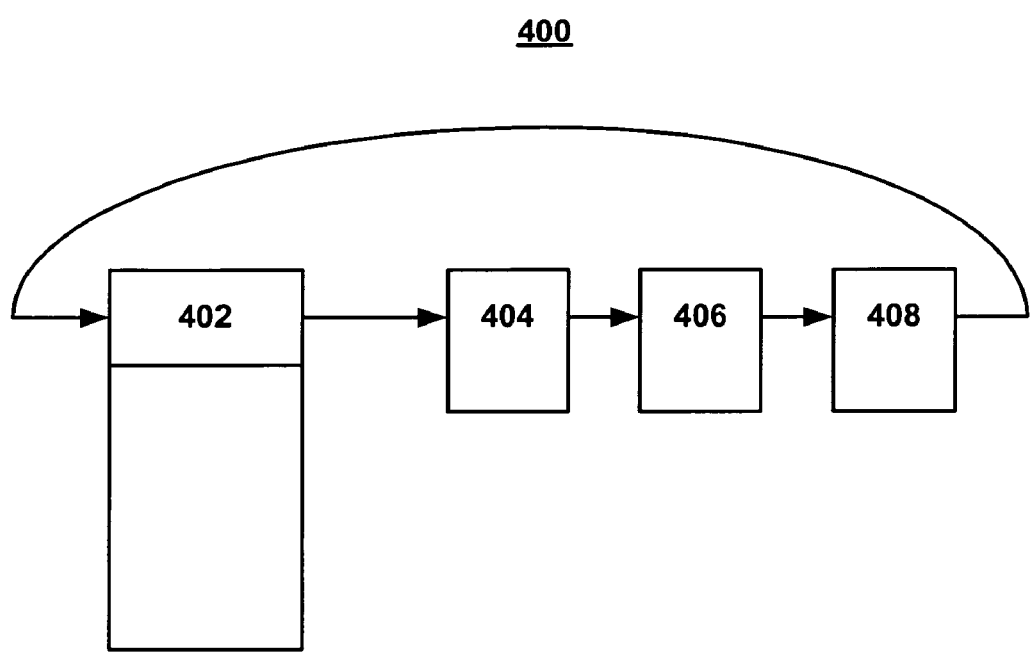
FIG. 4 is a block diagram of an exemplary method wherein a pointer of a larger structure is actually a pointer to the smaller structure in accordance with an embodiment of the present invention.

Another programming possibility may be the utilization of smaller structures acting as placeholders in data structures consisting primarily of a single larger structure. That is, instead of a pointer to the smaller structure actually being a pointer to the larger structure, a pointer to the larger structure is actually a pointer to the smaller structure. This construct is particularly important to identify when the smaller structures are in a contiguous array, by examining only the data structure of larger structures, an erroneous assumption may be that the array of smaller structures is actually an array of the larger structure. For example (with reference to FIG. 4), the smaller structure (e.g., 404, 406, and 408) consists of next and previous pointers of the larger structure type (e.g., a linked list such as 401), larger structure 401's first member 402 is made to be identical to those of the smaller structure (e.g., 404, 406, and 408). Furthermore, object 408 points back to object 402. This type of programming is often used in hash tables. This allows hash tables to be an array of the smaller structure type, thereby saving space.

Thus, with the three previously mentioned array issues, if there is a pointer to an object that is larger than the pointed-to type, it is uncertain whether the object is an array of objects of the pointed-to type, the pointed-to type followed by an array of that type's last member, or some other larger type that has not yet been recognized. Therefore, a further process of differentiating the possible node types must be utilized to ensure the correct recognition of node types throughout the memory dump. For example, if one node (e.g., node 302 of FIG. 3A) is misidentified, then this may lead to the misidentification of nodes 303, 304, and on down the chain. Thus, when the results are analyzed they may be incorrect, and the technician may be sent searching for the error in the wrong direction before resorting back to searching through the 25,000 possible structure types.

In one embodiment, a protocol such as "::typegraph" may be used to build and process node type information from a kernel memory crash dump. In order to correctly identify as many nodes as possible with a minimum of unknown nodes, in one embodiment, the process of node identification may be broken down into a plurality of passes utilized by the ::typegraph process to ensure that a node is correctly identified in context with the previously mentioned programming nuances. Furthermore, ::typegraph may retain the node type information after completion for further analysis.

With reference again to step 202 of FIG. 2, an initial pass (e.g., constructing the pointer graph) is utilized to identify known nodes and edges, and identify unknown nodes and edges. This initial pass may construct the nodes from the kmem caches and module data, and construct the edges by propagating out from the module data. For example, nodes that are in module data or known kmem caches may be marked with their known type.

With reference now to step 203 of FIG. 2, a first pass (e.g., conservative propagation) is utilized to infer nodes based on propagation from known nodes, and infers only the nodes that are of same size (e.g., perform breadth first propagation). For example, in FIG. 3A the first pass through the kernel memory crash dump may be a conservative propagation breadth-first pass from nodes of known types. As described herein, that may include any node (e.g., 301 and 320) which is within first section 350. During the first pass, if an inferred type is less than half of a node's size or larger than twice its inferred type (e.g., the phenomena described herein), the type is added to the node's typelist, but the node is not enqueued for further processing (e.g., there is no descent). For example, if during the initial evaluation of node 301, the inferred type of node 302 is less than half the actual size of node 302 then node 302 may be treated as a possible known type node 302, but node 302 will not be moved into first section 350. Therefore, the propagation of the nodes (e.g., 303 and 304) beyond node 303 will not occur. In one embodiment, each node may be marked as it is processed to guarantee halting. This first pass may continue until no further improvement is made (e.g., all known nodes have been evaluated).

With reference now to step 204 of FIG. 2, a second pass (e.g., array determination) is utilized to process nodes that were inferred but not descended to in pass one. For example, in FIG. 3A, after the completion of the first pass, the second pass may be conducted as an array determination pass. During this evaluation, all nodes that stopped further processing during pass one are visited. For example, node 302 may be evaluated to determine if it is an array, but node 303 would not initially be evaluated since the first pass stopped at node 302. Furthermore, if the node has more than one structural interpretation (e.g., two possible structure types), the node may be polymorphic and further processing will not occur during the second pass.

To determine the presence of a flexible array member (FAM), the last member of the inferred type is checked. If the last member is an array with only a single element, it is assumed to be a FAM. However, if it is not a FAM, and the node was allocated out of an unnamed cache (e.g., a kmem_alloc_n cache) then the size of the cache and the size of the inferred type is calculated and subtracted from the size of the node. If the value is less than or equal to the size of the next smaller kernel memory (kmem) cache, it must not be an array of objects of the inferred type and processing of the node is aborted (e.g., stopped for the remainder of the second pass).

For example (with reference to FIG. 3B) cache sizes are fixed, so a request for a cache is received and the array 380 is assigned based on the smallest size that is still greater than or equal to the size requested. If a request is for 100-bytes the system may have caches of size 96-bytes or 128 bytes. Since 96-bytes is too small, the assigned array 380 may be the 128-byte cache which will include an amount of wasted space 390 (e.g., 28-bytes). When trying to solve the array issue, initially there may be a pointer to array 380 which is a pointer to a certain structure (e.g., ANON_T), with an analysis of the possible array 380 it can be calculated that there is enough room in array 380 for 4 structures (e.g., 382, 384, 386, and 388) with a portion of wasted space 390. For example, if an ANON_T were 16-bytes large then four ANON_T's would be 64-bytes. If array 380 is a 72-byte cache then a search is made for the next size smaller cache. If there is a cache of size 68-bytes then the assumption is incorrect since the allocator would not have allocated 72-bytes of memory when the 68-byte cache would have worked. In such a case, this would not be 4 ANON_T's and the structure would not be propagated as a structure of 4 ANON_T's. This step is utilized to prevent the process from making the wrong assumption.

However, if the node is assumed to be an array (either a FAM or not after the size analysis described herein), a pointer check may be used to iterate through the array checking that each hypothesized pointer member points to either null or valid memory. If the pointer check fails, it is assumed that the node is not an array of the inferred type and processing of the node is aborted (e.g., stopped for the remainder of the second pass). However, if the pointer check passes, then the node is assumed to be an array and the type is propagated using the conservative propagation methods of pass one. In one embodiment, pass two continues to iterate over all unprocessed nodes until no further improvement is made.

With reference now to step 205 of FIG. 2, a third pass (e.g., type coalescence) is utilized to process all nodes that may have more than one structural interpretation are visited. For example, in FIG. 3A during the evaluation a node that may be polymorphic and was not processed during the second pass may now be processed. In general, the third pass coalesces types by preferring structural interpretations to non-structural interpretations. For example, if a node has a pointer of type char (pointed to by caddr_t) and a pointer of type struct frotz pointing to it, the types may be coalesced into struct frotz. However, if more than one structural interpretation is present (e.g., two structural pointers pointing to a node), no coalescing will occur.

With reference now to step 206 of FIG. 2, a fourth pass (e.g., non-array type inference) is utilized. This pass is the least conservative pass, and during this evaluation it is assumed that any arrays have been determined. Therefore, all unknown nodes are processed and all incoming edges are checked. If there is only one possible structural interpretation for the unknown node, the node is assumed to be of that type and propagation continues down the branch starting again with pass one style (e.g., conservative propagation). For example, with reference to FIG. 3B, if array 380 was never resolved as an array of four objects (or two objects, or the like), then the entire array 380 is propagated simply as an object 395. In general, the fourth pass picks up nodes that are larger than their inferred type, but for which the inferred type is likely accurate. For example, a directory cache entry (struct dcentry), with its FAM of characters is typically not identified until this pass.

Figure 5:
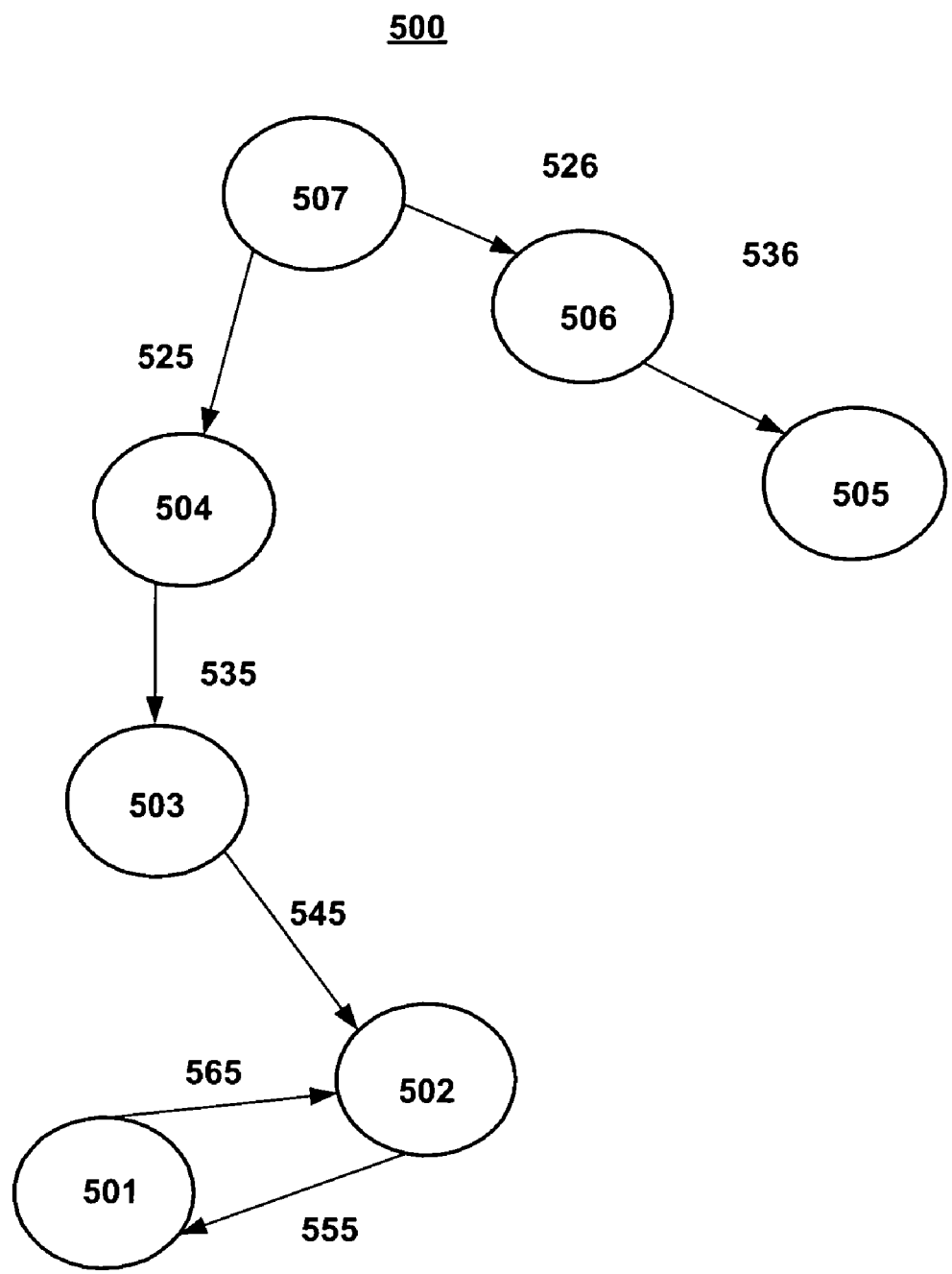
FIG. 5 is a block diagram of an exemplary system for finding the reach of an unknown node in accordance with one embodiment of the present invention.

With reference now to step 207 of FIG. 2, a post-pass may be conducted to report the unknown node of greatest reach. The post-pass may be utilized as a pass to determine unknown reach (e.g., the number of unknown nodes reachable from a given node). That is, after the overall recognition four-pass process has concluded, it may be useful to know which node is the greatest impediment to further identification. In order to select which node is the greatest impediment, unknown reach is determined in the post-pass by proceeding depth-first through a graph (e.g., graph 500 of FIG. 5). For example (with reference to FIG. 5), if node 507 is unknown then there are a six other nodes (501–506) which are also unknown. If the type of the unknown node 507 can somehow be determined a further analysis of the six other nodes may occur allowing for a much higher recognition rate. In a cycle, the first node encountered in the cycle will have the greatest reach. For example node 502 has a greater reach than node 501. In some cases, the type of the unknown node may be determined by utilizing any number of methods described herein.

Once the unknown node is identified, a function such as "::istype" may be used to manually label the type of the node. Once the node type is labeled, the program again begins to propagate using the conservative propagation methods of pass one and continuing through each of the four pass methods described herein. For example, if a nineteen-kilobyte structure is not identified, then the recognition success may be significantly reduced. However, if the structure can be identified and labeled, the overall recognition rate may have a dramatic increase (e.g., from 75% to better than 99%).

With reference now to step 207 of FIG. 2, an output identifying the type of as many nodes of the crash dump as possible may be generated. For example, as shown in FIG. 6A, an exemplary report 600 of the possible results of a processed memory dump is shown in accordance with an embodiment of the present invention. For example, a protocol such as "::typegraph" may be used to monitor the performance of each pass and provide information (e.g., report 600) on the nodes identified and the overall time elapsed. In one embodiment, the information found in ::typegraph may include which pass has been completed, how many total nodes in memory dump, unknown (unmarked), known, conjectured, conjectured fragments, known or conjectured, conflicts, time elapsed (per pass and total time), or the like.

With reference now to FIG. 6B, a protocol such as "::whattype" may be used to evaluate the type information stored by ::typegraph to determine the type of a specific node. For example, input 625 shows a request for the node type de7ae628 (e.g., node de7ae628 may be the node which caused the buffer overrun). In one embodiment, if the language in the result is "weak" (e.g., possibly, maybe, could be, or the like), ::whattype may be showing that the result is likely but not certain. However, with reference to FIG. 6C, if the language is bold (e.g., no modifier, is, certainly, or the like), ::whattype may be showing that the node is definitely known.

With reference now to FIG. 6D, a verbose version 675 of a protocol such as "::whattype" is shown. Specifically, this may include inferences, status information, the reach of the node, which node the pointer to the specific node is pointing from, or the like. The verbose version 675 of ::whattype allows a technician to see the known details of the node as well as any possible inferences made during the ::typegraph process.

Figure 7:
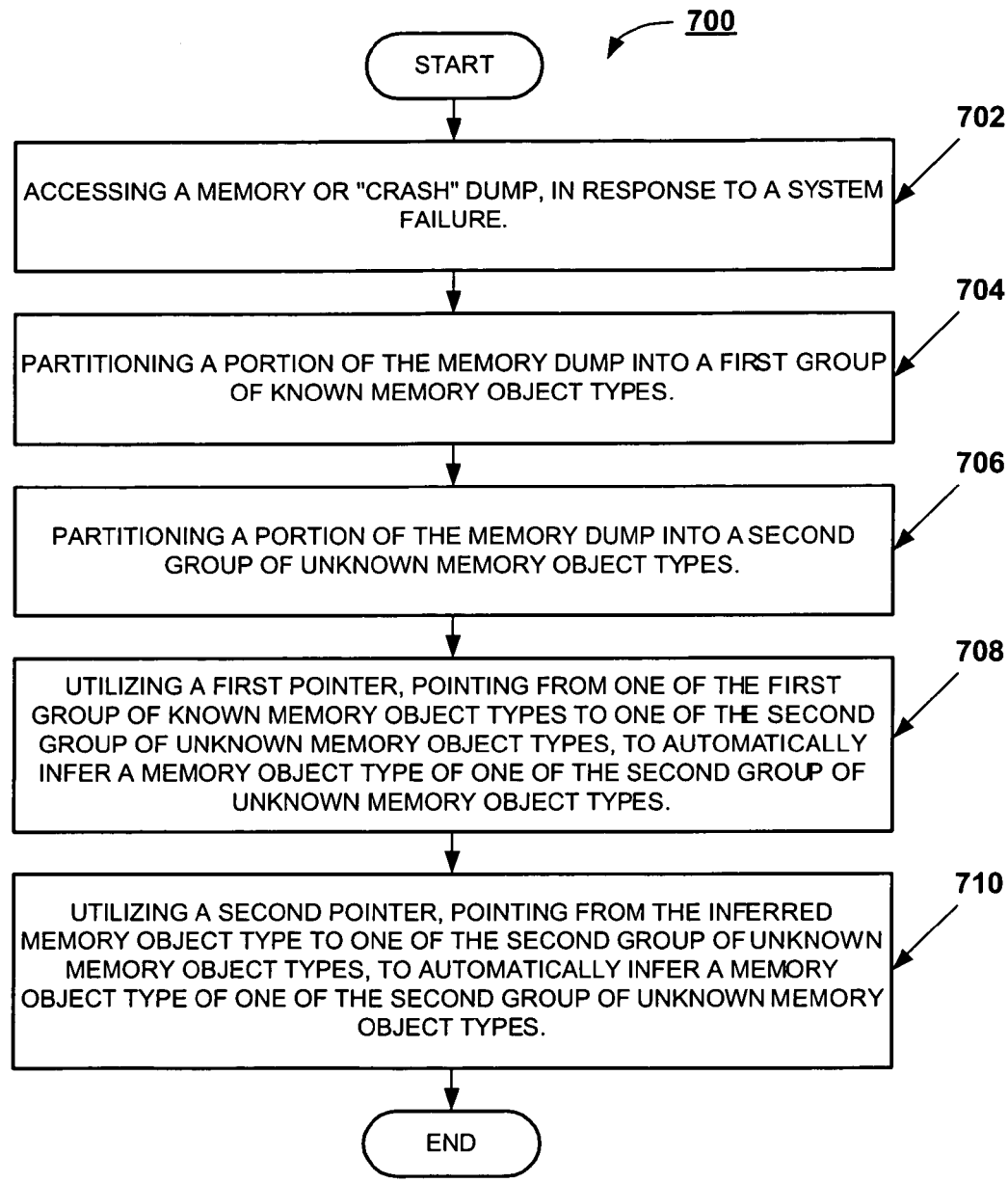
FIG. 7 is a flowchart of the steps performed for postmortem object type identification in accordance with one embodiment of the present invention.

With reference now to FIG. 7, a flowchart of the steps performed for postmortem object type identification is shown in accordance with one embodiment of the present invention.

Referring now to FIG. 3A and step 702 of FIG. 7, a memory or "crash" dump 300 is accessed. In one embodiment, the access of the memory or "crash" dump may be in response to a system failure. As stated herein, memory dump 300 may be a post-mortem memory dump 300. Furthermore, the post-mortem memory dump 300 may be taken from a system that crashed due to a buffer overrun.

With reference still to FIG. 3A and now to step 704 of FIG. 7, a portion of memory dump 300 is partitioned into a first group of known memory objects. As stated herein, first group 350 may be comprised of memory objects (e.g., nodes) which may be contained within module data segments. They may also be nodes allocated from kernel memory caches of a known type. Furthermore, the memory object may be from any of a plurality of known kernel memory caches such as process from process cache, thread from thread cache, message block from message block cache, or the like. In one embodiment, the first group (or first plurality) of known nodes of the memory dump information may be identified automatically.

Referring still to FIG. 3A and now to step 706 of FIG. 7, a portion of memory dump 300 is partitioned into a second group of unknown memory objects. As stated herein, second group 375 may be comprised of memory objects (e.g., nodes) which may not be contained within module data segments. They may also be nodes allocated from kernel memory caches of an unknown type. Furthermore, the memory object may be from any of a plurality of unknown kernel memory caches.

With reference still to FIG. 3A and now to step 708 of FIG. 7 in one embodiment a first pointer, pointing from one of the first group of known memory object types to one of the second group of unknown memory object types, is utilized to automatically infer (e.g., propagate) a memory object type of one of the second group of memory object types. For example, as stated herein pointer 325 pointing from known memory object 301 to unknown memory object 302 may be utilized in conjunction with its offset and pointer type to determine the type of memory object 302. In one embodiment, this process may be performed on every known memory object (e.g., 301 and 320) in memory dump 300.

With reference still to FIG. 3A and now to step 710 of FIG. 7, in one embodiment a second pointer, pointing from the inferred memory object type (e.g., node 302) to one of the second group of unknown memory object types, is utilized to automatically infer (e.g., propagate) a memory object type of one of the second group of memory object types. For example, as stated herein pointer 335 pointing from inferred memory object 302 to unknown memory object 303 may be utilized in conjunction with its offset and pointer type to determine the type of memory object 303. In one embodiment, this process may be performed on every inferred memory object (e.g., 302 through 305 and 322) in memory dump 300. In yet another embodiment, an output containing type identifications for the known and the inferred nodes of the memory dump information may be automatically generated. Furthermore, the output may be a useful tool for determining a cause of a system failure.

Figure 8:
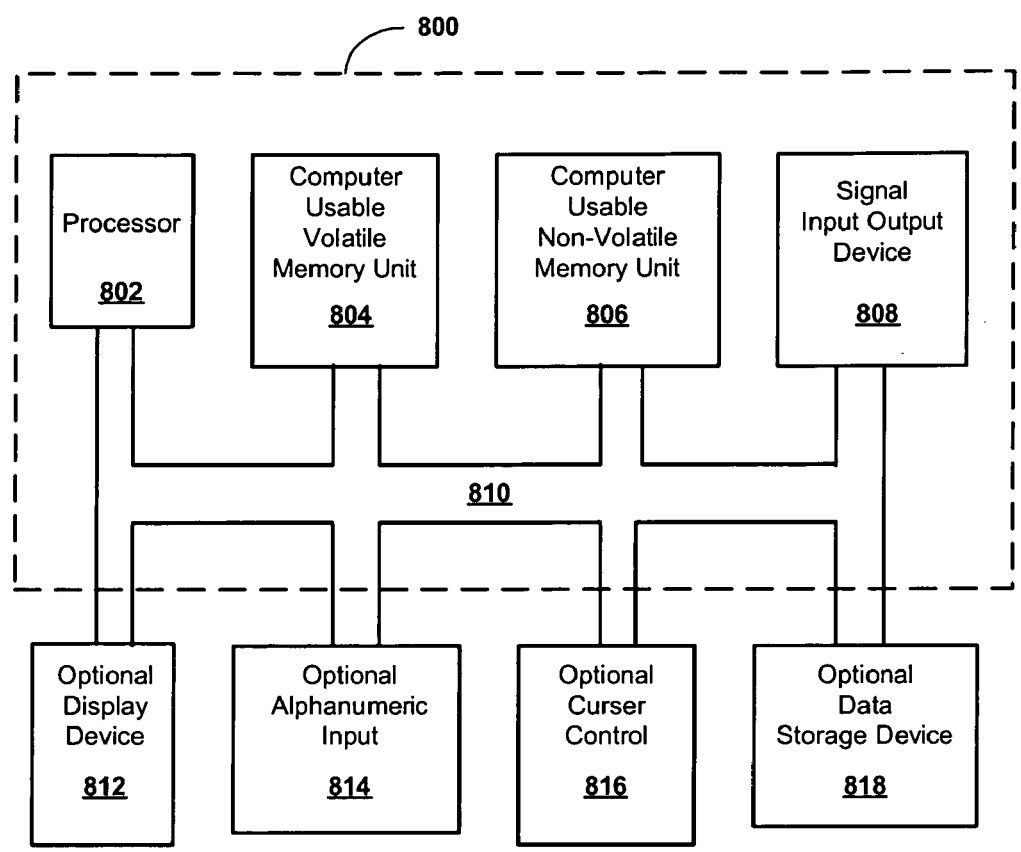
FIG. 8 is a block diagram of an embodiment of an exemplary computer system used in accordance with the present invention.

With reference now to FIG. 8, a block diagram of an embodiment of an exemplary computer system 800 used in accordance with the present invention. It should be appreciated that system 800 is not strictly limited to be a computer system. As such, system 800 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 800 and executed by a processor(s) of system 800. When executed, the instructions cause computer 800 to perform specific actions and exhibit specific behavior that is described in detail herein.

Computer system 800 of FIG. 8 comprises an address/data bus 810 for communicating information, one or more central processors 802 coupled with bus 810 for processing information and instructions. Central processor unit(s) 802 may be a microprocessor or any other type of processor. The computer 800 also includes data storage features such as a computer usable volatile memory unit 804 (e.g., random access memory, static RAM, dynamic RAM, etc.) coupled with bus 810 for storing information and instructions for central processor(s) 802, a computer usable non-volatile memory unit 806 (e.g., read only memory, programmable ROM, flash memory, EPROM, EEPROM, etc.) coupled with bus 810 for storing static information and instructions for processor(s) 802. System 800 also includes one or more signal generating and receiving devices 808 coupled with bus 810 for enabling system 800 to interface with other electronic devices and computer systems. The communication interface(s) 808 of the present embodiment may include wired and/or wireless communication technology.

Optionally, computer system 800 may include an alphanumeric input device 14 including alphanumeric and function keys coupled to the bus 810 for communicating information and command selections to the central processor(s) 802. The computer 800 can include an optional cursor control or cursor directing device 816 coupled to the bus 810 for communicating user input information and command selections to the central processor(s) 802. The cursor-directing device 816 may be implemented using a number of well known devices such as a mouse, a track-ball, a track-pad, an optical tracking device, and a touch screen, among others. Alternatively, it is appreciated that a cursor may be directed and/or activated via input from the alphanumeric input device 814 using special keys and key sequence commands. The present embodiment is also well suited to directing a cursor by other means such as, for example, voice commands.

The system 800 of FIG. 8 may also include one or more optional computer usable data storage devices 818 such as a magnetic or optical disk and disk drive (e.g., hard drive or floppy diskette) coupled with bus 810 for storing information and instructions. An optional display device 812 is coupled to bus 810 of system 800 for displaying video and/or graphics. It should be appreciated that optional display device 812 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for postmortem object type identification. Furthermore, the present invention provides a method and system for postmortem object type identification and resolves the identity of most of the objects within the memory dump without tracking object allocation during the operational times of a computing system. Additionally, the present invention provides a method and system for postmortem object type identification which is cost efficient and time saving.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method for postmortem object type identification comprising:
    a) accessing a memory dump;
    b) partitioning a portion of said memory dump into a first group of known memory object types;
    c) partitioning a portion of said memory dump into a second group of unknown memory object types;
    d) utilizing a first pointer, pointing from one of said first group of known memory object types to one of said second group of unknown memory object types, to automatically infer a memory object type of one of said second group of unknown memory object types; and
    e) utilizing a second pointer, pointing from said inferred memory object type to one of said second group of unknown memory object types, to automatically infer a memory object type of one of said second group of unknown memory object types.

2. The method as recited in claim 1 further comprising:
    f) repeating d) and e) to infer a plurality of memory object types of said second group.

3. The method as recited in claim 2 further comprising: using the inferred types to identify an overrun buffer.

4. The method as recited in claim 2 further comprising:
    g) marking said inferred memory object type of one of said second group of unknown memory object types as a known memory object; and
    h) transferring said inferred memory object type from said second group of unknown memory object types to said first group of known memory object types.

5. The method as recited in claim 1 wherein said d) and e) are performed on each one of said first group of memory object types.

6. The method as recited in claim 1 wherein said d) and e) are performed on each one of said inferred memory object types.

7. The method as recited in claim 1 wherein said memory dump is a postmortem crash memory dump.

8. The method as recited in claim 1 wherein said known memory object types and unknown memory object types are dynamically allocated.

9. The method as recited in claim 1 wherein said first group of known memory object types are contained within module data segments and are allocated from kernel memory caches of known type.

10. A computer system comprising:
    a bus;
    a memory unit coupled with said bus; and
    a processor coupled with said bus, said processor for executing a method for object type identification in postmortem memory dump comprising:
    accessing a postmortem memory dump;
    determining nodes of a known type;
    determining nodes of an unknown type;
    utilizing nodes inferred type and an edge's source offset to determine an edge type for each outgoing edge; and
    de-referencing said edge type to determine a destination node type.

11. The computer system of claim 10 further comprising: constructing a graph comprised of said nodes and said edges.

12. The computer system of claim 10 further comprising: adding said destination node type to a destination node type list; and
    marking and enqueing said destination node.

13. The computer system of claim 10 wherein said nodes are dynamically allocated memory objects.

14. The computer system of claim 10 wherein said outgoing edge is a pointer pointing from an edge of one of said nodes to said edge of another one of said nodes.

15. The computer system of claim 10 wherein said nodes of a known type are contained within module data segments.

16. The computer system of claim 10 wherein said nodes of a known type are allocated from kernel memory caches of known type.

17. The computer system of claim 10 wherein a plurality of passes are used to determine said destination node type.

18. The computer system of claim 17 wherein said plurality of passes are comprised of:
    an conservative pass which infers the unknown nodes based on propagation from the known nodes;
    an array determination pass to process nodes which have one structural interpretation for the node;
    a type coalescence pass to select preferred structural possibilities over non-structural ones;
    a non-array type inference pass to process nodes if there is only one possible structural inference for the unknown node; and
    an unknown reach pass to process which unknown node has the greatest reach.

19. The computer system of claim 18 wherein said array determination pass is further comprised of:
    a cache allotment analysis, wherein the size of a possible array structure of said node is compared with possible cache sizes available to said node.

20. A computer-usable medium having computer-readable program code embodied therein for causing a computer system to perform a method of identifying nodes comprising:
    a) accessing memory dump information in response to a system failure;
    b) automatically identifying a first plurality of known nodes of said memory dump information;
    c) automatically inferring a first plurality of inferred nodes of said memory dump information by propagating from said first plurality of known nodes to said first plurality of inferred nodes;

d) automatically inferring a second plurality of inferred nodes of said memory dump information by propagating from said first plurality of inferred nodes to said second plurality of inferred nodes; and e) automatically generating an output containing type identifications for said known and inferred nodes of said memory dump information, wherein said output is a tool useful for determining a cause of said system failure.

21. A method as described in claim 20 wherein said inferring is the result of pointer types from known and inferred nodes and wherein said c) and said d) are performed only for propagated-to nodes that are of the same size as their pointed-to type.

22. A method as described in claim 21 further comprising f) inferring nodes that are not of the same size as their pointed-to type.

23. A method as described in claim 22 wherein said f) comprises inferring nodes by processing nodes that are array structures.

24. A method as described in claim 23 wherein said f) further comprises inferring nodes by performing type coalescence.

25. A method as described in claim 24 wherein said f) further comprises inferring nodes by performing non-array type inference.

26. A method as described in claim 20 wherein said b) is performed according to kmem cache information and module data.

27. A method as described in claim 20 wherein said a) comprises constructing a pointer graph of said memory dump information and wherein said pointer graph comprises nodes and pointers.

28. A method as described in claim 20 further comprising generating a report indicating the node having the largest unknown reach.

* * * * *